United States Patent Office 2,872,371
Patented Feb. 3, 1959

2,872,371

IMIDAZOLE COMPOSITION FOR TREATING COCCIDIOSIS

Edward F. Rogers, Middletown, N. J., assignor to Merck & Co., Inc., Rahway, N. J., a corporation of New Jersey No Drawing. Application December 26, 1957
Serial No. 705,082

29 Claims. (Cl. 167—53.1)

This invention relates generally to the prevention and treatment of coccidiosis. More particularly it is concerned with imidazole compounds which are effective in combatting coccidiosis. Still more particularly, it is concerned with 4,5-imidazoledicarboxamide and certain derivatives thereof, and with novel compositions containing such substances.

This application is a continuation-in-part of my co-pending application Serial No. 674,021, filed July 25, 1957.

Coccidiosis is a common and widespread poultry disease caused by several species of protozoan parasites of the genus Eimeria, such as *E. tenella, E. necatrix, E. acervulina, E. maxima, E. hagani* and *E. brunetti. E. tenella* is the causative agent of a severe and often fatal infection of the caeca of chickens, which is manifested by severe and extensive hemorrhage, accumulation of blood in the caeca, and the passage of blood in the droppings. *E. necatrix* attacks the small intestine of the chick causing what is known as intestinal coccidiosis. Related species of coccidia such as *E. meleagridis* and *E. adenoides* are causative organisms of coccidiosis in turkeys. When left untreated, the severe forms of coccidiosis lead to poor weight gain, reduced feed efficiency and high mortality in fowl. The elimination or control of this disease is, therefore, of paramount importance to the poultry raising industry.

I have now found that 4,5-imidazoledicarboxamide, 1-ethyl-4,5-imidazoledicarboxamide and 1-methyl-4,5-imidazoledicarboxamide, and certain acylates thereof are very active against the protozoa which cause coccidiosis. As discussed more fully hereinbelow the development of coccidiosis is prevented when small amounts of these substances are fed to poultry. One object of the present invention, therefore, is to provide a new method for preventing and controlling coccidiosis. It is a further object to provide novel compositions which, when added to animal feedstuffs, are extremely effective in preventing coccidiosis. A still further object is provision of animal feedstuffs containing certain imidazoledicarboxamide compounds. An additional object of the invention is the provision of new compounds which are highly potent coccidiostats. Other objects will become apparent from the ensuing discussion of my invention.

4,5-imidazoledicarboxamide has the structural formula

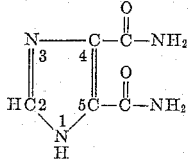

It is a high melting solid with limited solubility in water. In accordance with the present invention, it has been discovered that 4,5-imidazoledicarboxamide itself is a highly potent coccidiostat which may be successfully employed to prevent or treat coccidiosis when administered to poultry. It has further been found that 1-ethyl-4,5-imidazoledicarboxamide and 1-methyl-4,5-imidazoledicarboxamide are also very active coccidiostats and may be used to prevent or treat this disease. It has additionally been discovered that certain mono- and di-lower acyl derivatives of such imidazoledicarboxamides are potent coccidiostats. These compounds are conveniently fed to poultry as a component of the feed of the animals although they may also be given dissolved or suspended in the drinking water when the properties of the substance permit. According to a preferred aspect of the invention, novel compositions for the treatment of coccidiosis are provided in which these imidazoledicarboxamides are the active ingredient. Such compositions comprise the imidazoledicarboxamides intimately dispersed in or intimately admixed with an inert carrier or diluent. By an inert carrier is meant one that is nonreactive with respect to the 4,5-imidazoledicarboxamides, and that may be administered with safety to the animals to be treated. The carrier or diluent is preferably one that is or may be an ingredient of the animal feed.

The compositions which are a preferred feature of my invention are the so-called feed supplements in which the active ingredient is present in relatively large amounts and which are suitable for addition to the poultry feed directly or after an intermediate dilution or blending step. Examples of carriers or diluents suitable for such compositions are animal feed ingredients such as distillers' dried grains, corn meal, citrus meal, fermentation residues, ground oyster shells, Attapulgus clay, wheat shorts, molasses solubles, corn cob meal, edible vegetable substances, toasted dehulled soya flour, soybean mill feed, antibiotic mycelia, soya grits, crushed limestone and the like. The 4,5-imidazoledicarboxamides are intimately dispersed or admixed throughout the solid inert carrier by methods such as grinding, stirring, milling or tumbling. By selecting proper diluents and by altering the ratio of carrier to active ingredient, compositions of any desired concentration may be prepared. Formulations containing from about 1% to about 40% by weight, and preferably from about 2–25% by weight, of active ingredient are particularly suitable for addition to poultry feedstuffs; formulations having from about 2.5–10% by weight of coccidiostat are very satisfactory. The active compound is usually dispersed or mixed uniformly in the diluent but in some instances may be sorbed on the carrier. The optimal concentration of coccidiostat in these feed supplements will depend to some extent on the particular 4,5-imidazoledicarboxamide compound employed. Since it is convenient for the feed manufacturer to use about one pound of feed supplement for each ton of finished feed, the preferred concentration of any one of my coccidiostats in a feed supplement is partly a function of the level of active ingredient desired in the finished feed.

Of the imidazoledicarboxamide compounds which have been found by this invention to prevent or control coccidiosis, I prefer to employ 4,5-imidazoledicarboxamide or 1-ethyl-4,5-imidazoledicarboxamide since these substances control coccidiosis when fed at very low levels in the diet of the animal. With 4,5-imidazoledicarboxamide, good results are obtained by administering the compound to chickens in an amount equal to about 0.0005% to about 0.02% by weight of the feed consumed daily. For optimum results it is preferred to administer from about 0.00075% to about 0.0075% by weight of the feed intake. Greater or lesser amounts of the substance may, of course, be administered as indicated by particular circumstances.

4,5-imidazoledicarboxamide and 1-methyl-4,5-imidazoledicarboxamide may be prepared as described in Example 3 hereinbelow. For treating poultry, compositions of these materials in the carrier or diluent are uniformly dispersed in the animal feed. Typical examples of animal feed supplements containing 4,5-imidazoledicarboxamide in intimate dispersion in an animal feed ingredient are the following:

|   |   | lbs. |
|---|---|---|
| A. | 4,5-imidazoledicarboxamide | 5.0 |
|   | Corn distillers' dried grains | 95.0 |
| B. | 4,5-imidazoledicarboxamide | 10.0 |
|   | Ground oyster shells | 75.0 |
|   | Antibiotic mycelia | 15.0 |
| C. | 4,5-imidazoledicarboxamide | 2.5 |
|   | Wheat shorts (30–80 mesh) | 60.0 |
|   | Dried vitamin $B_{12}$ fermentation solubles | 37.5 |
| D. | 4,5-imidazoledicarboxamide | 5.0 |
|   | Citrus meal | 95.0 |
| E. | 4,5-imidazoledicarboxamide | 25.0 |
|   | Corn meal | 75.0 |
| F. | 4,5-imidazoledicarboxamide | 1.0 |
|   | Corn distillers' dried grains | 99.0 |
| G. | 4,5-imidazoledicarboxamide | 7.5 |
|   | Corn meal | 92.5 |
| H. | 4,5-imidazoledicarboxamide | 40.0 |
|   | Corn meal | 60.0 |
| I. | 4,5-imidazoledicarboxamide | 0.5 |
|   | Corn distillers' dried grains | 99.5 |

To make these and other similar feed supplements, the active ingredient is added to the carrier and the whole mixed for sufficient time to give substantially uniform dispersion of the coccidiostat in the carrier.

An additional preferred aspect of this invention is the provision of the new compound, 1-ethyl-4,5-imidazoledicarboxamide. This substance, which is likewise highly effective in preventing coccidiosis, may be prepared from methyl 4,5-imidazoledicarboxylate by treating this latter compound with a sodium lower alkoxide and ethyl iodide in an alcoholic solvent medium at an elevated temperature. The 1-ethyl compound thus obtained is treated with excess aqueous ammonia to form the diamide. Feed supplements comprising 1-ethyl-4,5-imidazoledicarboxamide intimately admixed in an inert carrier are prepared as described above for 4,5-imidazoledicarboxamide. As representative examples the following may be mentioned:

|   |   | lbs. |
|---|---|---|
| A. | 1-ethyl-4,5-imidazoledicarboxamide | 7.5 |
|   | Distillers' dried grains | 92.5 |
| B. | 1-ethyl-4,5-imidazoledicarboxamide | 5.0 |
|   | Soybean mill feed | 50.0 |
|   | Fine soya grits (containing lecithin) | 45.0 |
| C. | 1-ethyl-4,5-imidazoledicarboxamide | 10.0 |
|   | Molasses solubles | 90.0 |
| D. | 1-ethyl-4,5-imidazoledicarboxamide | 15.0 |
|   | Corn distillers' grains | 55.0 |
|   | Corn germ meal | 30.0 |
| E. | 1-ethyl-4,5-imidazoledicarboxamide | 2.5 |
|   | 4,5-imidazoledicarboxamide | 5.0 |
|   | Wheat shorts | 42.5 |
|   | Distillers' dried grains | 50.0 |
| F. | 1-ethyl-4,5-imidazoledicarboxamide | 25.0 |
|   | Corn distillers' dried grains | 75.0 |
| G. | 1-ethyl-4,5-imidazoledicarboxamide | 40.0 |
|   | Corn meal | 60.0 |

The supplements are usually made by mechanical milling, grinding or mixing of the ingredients to insure good distribution of the active compounds, although other techniques such as spraying may be employed if desired.

For best results when used as a prophylactic agent to control coccidiosis in chicks, 1-ethyl-4,5-imidazoledicarboxamide is fed to poultry at a level of from about 0.003% to about 0.015% by weight of the daily ingested feed. Favorable results are achieved when about 0.002% to 0.025% of compound by weight of diet are given. To combat severe infections, somewhat larger doses of 1-ethyl-4,5-imidazoledicarboxamide may be employed.

I have further discovered that 1-methyl-4,5-imidazoledicarboxamide is effective in controlling coccidial infections in chicks when administered at dose levels of from about 0.01% to 0.05%, and preferably at about 0.015% to 0.04% by weight of the daily food intake. For use in treating coccidiosis, compositions containing the 1-methyl compound uniformly dispersed in one or more inert carriers are prepared, and such feed supplements then mixed with the poultry feedstuff to the desired dosage level.

Illustrative of feed supplement formulations containing this product are:

|   |   | Lbs. |
|---|---|---|
| A. | 1-methyl-4,5-imidazoledicarboxamide | 15.0 |
|   | Molasses solubles | 85.0 |
| B. | 1-methyl-4,5-imidazoledicarboxamide | 25.0 |
|   | Soybean mill feed | 75.0 |
| C. | 1-methyl-4,5-imidazoledicarboxamide | 20.0 |
|   | Corn germ meal, dried | 30.0 |
|   | Corn distiller's grains | 50.0 |
| D. | 1-methyl-4,5-imidazoledicarboxamide | 10.0 |
|   | Citrus meal | 60.0 |
|   | Soya flour | 30.0 |
| E. | 1-methyl-4,5-imidazoledicarboxamide | 40.0 |
|   | Soya grits | 60.0 |
| F. | 1-methyl-4,5-imidazoledicarboxamide | 2.5 |
|   | Antibiotic mycelia | 50.0 |
|   | Ground limestone | 47.5 |

I have also discovered that the mono- and di- lower acyl derivatives of 4,5-imidazoledicarboxamide, 1-ethyl-4,5-imidazoledicarboxamide and 1-methyl-4,5-imidazoledicarboxamide, i. e. those products wherein one or both of the carbamido radicals is substituted with a lower acyl radical, are active compounds for the prevention of poultry coccidiosis. The new di-acyl compounds are believed to have the structural formula—

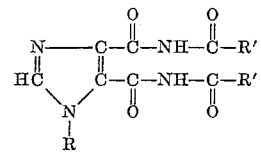

where R is hydrogen, methyl or ethyl, and R' is a lower alkyl radical such as methyl, ethyl and propyl.

These di-acyl compounds are prepared from the parent imidazoledicarboxamides by treating the latter substances with a lower aliphatic acid anhydride such as acetic or propionic acid anhydride at an elevated temperature. Optimum results are obtained when the acylation reaction conditions are relatively mild, i. e. it is not necessary or desirable to employ any of the usual acylation catalysts such as pyridine nor is it desirable to heat the reaction mixture for overly long periods of time.

The monoacyl 4,5-imidazoledicarboxamides are obtained by mild alkaline hydrolysis of the 4,5-bis-(N-di-acylcarbamyl)-imidazoles. I prefer to treat the latter compounds with a dilute aqueous alkali metal hydroxide, such as sodium or potassium hydroxide, at room temperature to effect the partial hydrolysis. The resulting products may have either of the following structural formulae depending upon which of the two lower acyl radicals is removed during the hydrolysis:

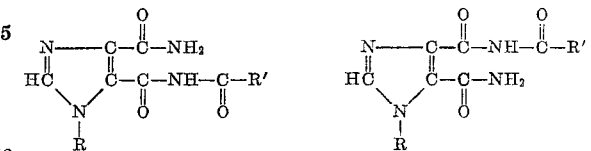

where R is hydrogen, methyl or ethyl, and R' is a lower alkyl radical. When R is a radical other than hydrogen, two mono-acyl compounds are possible. These products are therefore referred to herein as 1-ethyl-4(or 5)-lower-acylcarbamyl-5(or 4)-imidazolecarboxamide and 1- methyl-4(or 5)-loweracylcarbamyl-5(or 4)-imidazole-carboxamide.

Feed supplements containing the mono- and di-lower acyl derivatives of 4,5-imidazoledicarboxamide, 1-methyl-4,5-imidazoledicarboxamide and 1-ethyl-4,5-imidazoledicarboxamide discussed hereinabove are prepared by mixing such substances with a suitable carrier or diluent, as described above with respect to 4,5-imidazoledicarboxamide itself. Representative of such feed supplement formulations wherein the carrier is a feed ingredient are the following:

|   | Lbs. |
|---|---|
| A. 4,5-bis-(N-acetylcarbamyl)-imidazole | 10.0 |
| Corn distillers' dried grains | 90.0 |
| B. 4,5-bis-(N-acetylcarbamyl)-imidazole | 20.0 |
| Citrus meal | 40.0 |
| Ground oyster shell | 40.0 |
| C. 4-acetylcarbamyl-4-imidazolecarboxamide | 15.0 |
| Soya grits | 40.0 |
| Fermentation residues | 45.0 |
| D. 1-ethyl-4,5-bis-(N-acetylcarbamyl)-imidazole | 12.5 |
| Molasses solubles | 87.5 |
| E. 1-ethyl-4(or 5)-acetylcarbamyl-5(or 4)-imidazolecarboxamide | 15.0 |
| Corn meal | 85.0 |
| F. 1-methyl-4,5-bis-(N-acetylcarbamyl)-imidazole | 25.0 |
| Wheat shorts | 75.0 |
| G. 4,5-bis-(N-propionylcarbamyl)-imidazole | 40.0 |
| Soybean mill feed | 60.0 |
| H. 4,5-bis-(N-acetylcarbamyl)-imidazole | 5.0 |
| Wheat shorts | 50.0 |
| Fermentation residues | 45.0 |

The amount of the acyl imidazoles required for control of coccidiosis in chicks is very low, and feed supplements of the type described are, of course, further diluted by admixture with poultry feed, prior to administration of the active ingredients to chicks. Thus, with 4,5-bis-(N-acetylcarbamyl)-imidazole and 4,5-bis-(N-propionylcarbamyl)-imidazole, from about 0.002% to about 0.025% by weight of the active substance in the chick ration is sufficient to control coccidiosis, although for optimum results, it is preferred to employ from about a 0.003% to about a 0.015% dose level. When 1-ethyl-4,5-bis-(N-loweracylcarbamyl)-imidazoles, such as 1-ethyl-4,5-bis-(N-acetylcarbamyl)-imidazole are used as a chick coccidiostat, good results are achieved when from about 0.01% to 0.05% of coccidiostat by weight of the chick diet is administered to the birds, with optimum results obtained at levels of about 0.015% to 0.04% by weight of the ration. Slightly higher levels of active material in the finished feed are desirable for good control and prevention of coccidiosis when the derivatives of 1-methyl-4,5-imidazoledicarboxamide are employed.

The feed supplements of the type illustrated hereinabove are usually further diluted with materials such as corn meal or soybean meal before being incorporated in the animal feed. In this intermediate processing step the level of coccidiostat in the carrier is brought down from about 0.1% to about 1.0% by weight. This dilution serves to facilitate uniform distribution of the substance in the finished feed. The finished feed is one that contains a source of fat, protein, carbohydrate, minerals, vitamins and other nutritional factors.

In the above detailed discussion of my invention, emphasis has been placed on solid compositions wherein the active ingredient is mixed with a carrier in a feed supplement, in a so-called premix or in the final poultry feedstuff. This is the preferred method of administering the imidazoles. An alternate method of treatment is to dissolve or suspend the imidazole compounds in the drinking water of the animals. The quantity of coccidiostat which may be administered in this fashion is, of course, limited by the solubility of the product in water or by the quantity that may be suspended in the water without undue settling. Emulsifiers or surface-active agents may be employed for this latter purpose. 1-ethyl-4,5-imidazoledicarboxamide and 1-methyl-4,5-imidazoledicarboxamide are sufficiently water-soluble to make administration via the drinking water of the birds quite satisfactory. This technique is less feasible with the sparingly soluble 4,5-imidazoledicarboxamide, although solubilizing agents are often helpful in increasing the solubility level.

This invention is not limited to coccidiostatic compositions having only one of these 4,5-imidazoledicarboxamides as the sole active ingredient. Also contemplated within its scope is what might be called "combined treatment" where the 4,5-imidazoledicarboxamide and one or more other coccidiostats are administered concurrently. For such purposes, compositions may be prepared containing one of the imidazole compounds discussed above admixed with one or more of the other imidazoledicarboxamides and/or previously known coccidiostats such as sulfaquinoxaline, other sulfa compounds, 4,4'-dinitrocarbanilide-2-hydroxy-4,6 - dimethylpyrimidine complex, 3,3'-dinitrodiphenyldisulfide, arsanilic acid, 3-amino-4-hydroxy-phenylarsonic acid, 5-nitrofurfural semicarbazone, and the like.

It will likewise be understood by those skilled in this art that special feed supplement formulations containing vitamins, antibiotics, growth-promoting agents and other nutritional substances may include the imidazole compounds of this invention. A typical product of this type is the following:

| Ingredient: | Amount/lb. of Supplement, Grams |
|---|---|
| Riboflavin | 0.64 |
| DL-calcium pantothenate | 2.10 |
| Niacin | 3.67 |
| Choline chloride | 50.00 |
| Vitamin $B_{12}$ concentrate mg | 1.30 |
| Procaine penicillin | 0.84 |
| Vitamin A (100,000 u./g.) | 3.38 |
| Vitamin $D_3$ (200,000 u./g.) | 0.68 |
| Arsanilic acid | 18.36 |
| Butylated hydroxy toluene | 23.15 |
| DL-methionine | 23.15 |
| 4,5-imidazoledicarboxamide | 23.00 |
| Distillers' grains | To 1 pound |

The following examples are given for purposes of illustration and not by way of limitation:

EXAMPLE 1

*1-ethyl-4,5-imidazoledicarboxamide*

3.6 grams of sodium metal was dissolved in 900 ml. of methanol. 27.3 grams of dimethyl 4,5-imidazoledicarboxylate was added, followed by 25 grams of ethyl iodide. The resulting solution was heated at the reflux temperature for 16 hours. At the end of this time the solvents were distilled off in vacuo, and 300 ml. of ammonia water aded to the residual syrup. This mixture was mixed occasionally and allowed to stand at room temperature for about 60 hours.

After the above period, the solid which had formed was filtered off, washed with a little cold water and air-dried. The yield of crude product was 17 grams, melting point 215° C.

The crude material was dissolved in 850 ml. of boiling anhydrous ethanol and the hot solution filtered through a hot jacketed Büchner funnel to remove a slight amount of undissolved solid. The slightly hazy filtrate was re-filtered after treatment with a small quantity of activated charcoal to give a clear solution. The solution was concentrated to about two-thirds volume and then cooled in an ice bath for one hour. The precipitated 1-ethyl-4,5-imidazoledicarboxamide was isolated by filtration and air-dried. 12.1 grams of compound was obtained, melting point 215–216° C. Calcd. for $C_7H_{10}O_2N_4$: N, 30.75. Found: N, 30.89.

EXAMPLE 2

The coccidiostatic activity of 4,5-imidazoledicarboxamide, 1-ethyl-4,5-imidazoledicarboxamide and 1-methyl-4,5-imidazoledicarboxamide in chickens was determined by the following method:

Groups of 10 two or three-week old chicks were fed a mash diet containing various amounts of the compound to be tested. The active compound was uniformly dispersed in the feed. After having been on this ration for 24 hours, each chick was inoculated with 50,000 sporulated oocysts of E. tenella.

Other groups of ten chicks each were fed a similar mash diet which contained no coccidiostat. These were also infected after 24 hours and served as positive or infected controls. As positive controls, two to four groups of ten chicks each were employed. In some cases, still other groups of ten chicks each were fed the mash free of coccidiostat and were not infected with coccidiosis. These served as normal controls.

The diets were administered to the chicks for eight days following the date of infection. At the end of this time the infected birds still living were sacrificed. The oocyst count was determined by a microscopic examination of the caecal homogenates.

The results employing the indicated amounts of coccidiostat compound, and expressed as mean values are set forth in Table I.

TABLE I

| Exp. No. | Compound | Percent Compound In Diet | Percent Mortality | No. of Oocysts ×10⁻⁴ in Surviving Animals | Percent Weight Gain |
|---|---|---|---|---|---|
| 1 | 4,5-Imidazoledicarboxamide | 0.02 | 0 | <0.1 | 77 |
|  |  | 0.01 | 0 | 1.3 | 80 |
|  |  | 0.005 | 0 | <0.1 | 70 |
|  |  | 0.0025 | 20 | 1.2 | 75 |
|  | Infected controls | | 37 | 10.7 | 37 |
| 2 | 1-Ethyl-4,5-imidazoledicarboxamide | 0.02 | 0 | <0.1 | 123 |
|  |  | 0.01 | 0 | <0.1 | 126 |
|  |  | 0.005 | 10 | 15.4 | 120 |
|  | Infected controls | | 20 | 13.7 | 55 |
|  | Normal controls | | | | 121 |
| 3 | 1-Ethyl-4,5-imidazoledicarboxamide | 0.02 | 0 | <0.1 | 78 |
|  |  | 0.01 | 0 | <0.1 | 80 |
|  |  | 0.005 | 0 | 8.4 | 78 |
|  | Infected controls | | 25 | 10.9 | 59 |
| 4 | 1-Ethyl-4,5-imidazoledicarboxamide | 0.02 | 0 | <0.1 | 89 |
|  |  | 0.01 | 0 | 2.0 | 91 |
|  |  | 0.005 | 0 | 17.5 | 86 |
|  | Infected controls | | 37 | 10.7 | 38 |
| 5 | 1-Methyl-4,5-imidazoledicarboxamide | 0.1 | 0 | <0.1 | 50 |
|  |  | 0.05 | 0 | <0.1 | 57 |
|  |  | 0.025 | 0 | 1.3 | 56 |
|  | Infected controls | | 12.5 | 19.9 | 43 |
|  | Normal controls | | | | 60 |
| 6 | 1-Methyl-4,5-imidazoledicarboxamide | 0.1 | 0 | <0.1 | 45 |
|  |  | 0.05 | 0 | <0.1 | 61 |
|  |  | 0.025 | 0 | 1.6 | 64 |
|  | Infected controls | | 0 | 14.9 | 44 |
| 7 | 1-Methyl-4,5-imidazoledicarboxamide | 0.02 | 10 | 1.6 | 109 |
|  |  | 0.01 | 20 | 18 | 83 |
|  |  | 0.005 | 40 | 16 | 73 |
|  | Infected controls | | 20 | 13.7 | 55 |
|  | Normal controls | | | | 121 |
| 8 | 4,5-Imidazoledicarboxamide | 0.001 | 0 | 7.4 | 80 |
|  |  | 0.002 | 0 | 3.6 | 116 |
|  |  | 0.004 | 0 | <0.1 | 110 |
|  |  | 0.008 | 0 | <0.1 | 106 |
|  | Infected controls | | 70 | 8.2 | 21 |
|  | Normal controls | | 0 | | 96 |
| 9 | 4,5-Imidazoledicarboxamide | 0.001 | 0 | 22.2 | 35 |
|  |  | 0.002 | 0 | 0.5 | 67 |
|  |  | 0.004 | 0 | <0.1 | 63 |
|  |  | 0.008 | 0 | <0.1 | 64 |
|  | Infected controls | | 15 | 35.8 | 30 |
|  | Normal controls | | 0 | | 60 |

EXAMPLE 3

(a) 4,5-imidazoledicarboxamide 20 grams of dimethyl 4,5-imidazoledicarboxylate was dissolved in 400 ml. of concentrated ammonium hydroxide. In about 30 minutes 4,5-imidazoledicarboxamide began to precipitate. The mixture was allowed to stand at room temperature for about 20 hours. At the end of this time the product was isolated by filtration and air-dried. There was obtained 16 grams of 4,5-imidazoledicarboxamide, melting point >360° C.

(b) 1-methyl-4,5-imidazoledicarboxamide 14 grams of sodium was dissolved in 3.4 liters of methanol and to this solution was added 88.5 grams of di-methyl 4,5-imidazoledicarboxylate followed by 100 grams of methyl iodide. The solution was heated at reflux temperature for four hours and then concentrated in vacuo to about one-half volume. A small amount of activated charcoal was added and the mixture filtered. Ammonia gas was passed into the filtrate at 0–5° C. until the solution was saturated with ammonia. This solution was allowed to stand at room temperature for 16 hours during which time 1-methyl-4,5-imidazoledicarboxamide precipitated. The product was isolated by filtration, washed with cold methanol and air-dried. There was obtained 69.5 grams of 1-methyl-4,5-imidazoledicarboxamide, melting point 170–277° C.

EXAMPLE 4

(a) 4,5-bis-(N-acetylcarbamyl)-imidazole

Two grams of 4,5-imidazoledicarboxamide were refluxed for 15 hours in a mixture of 100 ml. of acetic anhydride and 10 ml. of acetic acid. At the end of this time the refluxing was stopped and the clear light-brown reaction mixture concentrated to dryness in vacuo at 100° C. The residue thus obtained was slurried with water, the slurry allowed to stand at room temperature for about one hour and then filtered. There was obtained in this manner two grams of crystalline 4,5-bis-(N-acetylcarbamyl)-imidazole. After recrystallization from methanol or acetic acid the material has a melting point of 259–260° C. Calcd. for $C_9H_{10}O_4N_4$: C, 45.38; H, 4.23; N, 23.53; neutral eq. 238. Found: C, 45.42; H, 4.26; N, 23.77; neutral eq. 241.

The anticoccidial activity of 4,5-bis-(N-acetylcarbamyl)-imidazole in chicks was determined by the method described in Example 2. The results are set forth in the following table:

| Percent in Feed | No. Chicks | Percent Mortality | Oocysts | Percent Weight Gain |
|---|---|---|---|---|
| 0.004 | 10 | 0 | 6.5 | 63 |
| 0.008 | 10 | 0 | <0.1 | 72 |
| Infected controls | 30 | 40 | 9.9 | 42 |
| Normal controls | 10 | 0 | | 74 |

(b) 4-acetylcarbamyl-5-imidazolecarboxamide 2.4 grams of 4,5-bis-(N-acetylcarbamyl)-imidazole obtained as described above was added to 25 ml. of water, and 10 ml. of 1 N sodium hydroxide added to the resulting suspension with vigorous shaking. A clear solution was obtained and allowed to stand at room temperature for about 60 hours. During this time there was precipitated two grams of 4-acetylcarbamyl-5-imidazolecarboxamide. The product upon recrystallization from methanol melted at 285° C. Calcd. for $C_7H_8O_3N_4$: C, 42.86; H, 4.10. Found: C, 43.30; H, 4.26.

The substance prevented coccidiosis and mortality due ot coccidiosis in chicks when fed at a level of 0.004% by weight of the feed.

EXAMPLE 5

1-ethyl-4,5-bis-(N-acetylcarbamyl)-imidazole

Two grams of 1-ethyl-4,5-imidazoledicarboxamide was refluxed for four hours in 50 ml. of acetic anhydride. At the end of this time the reaction mixture was concentrated to dryness in vacuo at 100° C. and the resulting residue crystallized from 20 ml. of methanol. There was obtained 1.4 grams of 1-ethyl-4,5-bis-(N-acetylcarbamyl)- imidazole, melting point 140–142° C. Recrystallization from methanol raised the melting point to 145–146° C.

The monoacetyl compound was prepared by the procedure described in Example 5.

1-methyl-4,5-bis-(N-acetylcarbamyl)-imidazole and 1-methyl-4(or 5)-acetylcarbamyl-5(or 4) imidazolecarboxamide are prepared from 1-methyl-4,5-imidazoledicarboxamide by the procedures described in Examples 4a and 4b above.

EXAMPLE 6

4,5-bis-(N-propionylcarbamyl)-imidazole

Ten grams of 4,5-imidazoledicarboxamide was added to 500 ml. of propionic anhydride and 50 ml. of propionic acid. The resulting mixture was stirred and heated at 125° C. for 27 hours. The temperature was then raised to the reflux point whereupon a clear solution was formed. The reaction mixture was cooled slowly to 100° C. and held at that temperature for one hour, during which time 4,5 - bis - (N-propionylcarbamyl)-imidazole crystallized. The solid material was removed by filtration, washed with ether and dried. It had a melting point of about 238° C. Recrystallization from ethanol raised the melting point to 239–240° C. Calcd. for $C_{11}H_{14}N_4O_4$: C, 49.61; H, 5.30. Found: C, 49.36; H, 5.27.

Coccidiosis and mortality in chicks was controlled by administering this substance to chicks at a level of 0.004% by weight of the diet.

Any departure from the above description is intended to be included within the scope of the claims.

What is claimed is:

1. A composition useful against coccidiosis which comprises 4,5-imidazoledicarboxamide in intimate dispersion in a solid animal feed ingredient.

2. A composition useful in the prevention and treatment of coccidiosis which comprises 4,5-imidazoledicarboxamide in intimate dispersion in an animal feedstuff.

3. A composition useful against coccidiosis which comprises a solid animal feed ingredient having in intimate dispersion therein from about 0.1% to about 40% by weight of 4,5-imidazoledicarboxamide.

4. A composition useful against coccidiosis which comprises a solid animal feed ingredient having in intimate dispersion therein from about 1.0% to about 25% by weight of 4,5-imidazoledicarboxamide.

5. A composition useful against coccidiosis which comprises a solid animal feed ingredient having in intimate dispersion therein about 2.5–5% by weight of 4,5-imidazoledicarboxamide.

6. A composition useful against coccidiosis which comprises an animal feedstuff having in intimate dispersion therein from about 0.0005% to about 0.02% by weight of 4,5-imidazoledicarboxamide.

7. A composition useful against coccidiosis which comprises an animal feedstuff having in intimate dispersion therein from about 0.00075% to about 0.0075% by weight of 4,5-imidazoledicarboxamide.

8. A composition useful against coccidiosis which comprises 1-ethyl-4,5-imidazoledicarboxamide in intimate dispersion in a solid animal feed ingredient.

9. A composition useful in the prevention and treatment of coccidiosis which comprises 1-ethyl-4,5-imidazoledicarboxamide in intimate dispersion in an animal feedstuff.

10. A composition useful against coccidiosis which comprises a solid animal feed ingredient having an intimate dispersion therein from about 0.1% to about 40% by weight of 1-ethyl-4,5-imidazoledicarboxamide.

11. A composition useful against coccidiosis which comprises a solid animal feed ingredient having in intimate dispersion therein from about 1.0% to about 25% by weight of 1-ethyl-4,5-imidazoledicarboxamide.

12. A composition useful against coccidiosis which comprises a solid animal feed ingredient having in intimate dispersion therein about 5% by weight of 1-ethyl-4,5-imidazoledicarboxamide.

13. A composition useful against coccidiosis which comprises an animal feedstuff having in intimate dispersion therein from about 0.002% to about 0.025% by weight of 1-ethyl-4,5-imidazoledicarboxamide.

14. A composition useful against coccidiosis which comprises 1-methyl-4,5-imidazoledicarboxamide in intimate dispersion in a solid animal feed ingredient.

15. A composition useful in the prevention and treatment of coccidiosis which comprises 1-methyl-4,5-imidazoledicarboxamide intimately dispersed in an animal feedstuff.

16. A composition useful against coccidiosis which comprises a solid animal feed ingredient having in intimate dispersion therein from about 1% to about 40% by weight of 1-methyl-4,5-imidazoledicarboxamide.

17. A composition useful against coccidiosis which comprises a solid animal feed ingredient having in intimate dispersion therein from about 2.5% to about 25% by weight of 1-methyl-4,5-imidazoledicarboxamide.

18. A composition useful against coccidiosis which comprises a solid animal feed ingredient having in intimate dispersion therein about 10% by weight of 1-methyl-4,5-imidazoledicarboxamide.

19. A composition useful against coccidiosis which comprises an animal feedstuff having in intimate dispersion therein from about 0.01% to about 0.05% by weight of 1-methyl-4,5-imidazoledicarboxamide.

20. A composition useful against coccidiosis which comprises a compound of the formula $$\begin{array}{c} \text{N}\!\!=\!\!=\!\!\text{C}\!-\!\text{CONHCR}' \\ \| \quad\quad \| \quad\quad\quad\quad \| \\ \text{HC} \quad\quad \text{C}\!-\!\text{CONHCR}' \\ \diagdown\;\;\diagup \quad\quad\quad\quad \| \\ \text{N} \quad\quad\quad\quad\quad\; \text{O} \\ | \\ \text{R} \end{array}$$

in intimate dispersion in a solid animal feed ingredient, where R is selected from the class consisting of hydrogen, methyl and ethyl and R' is a lower alkyl radical.

21. A composition useful against coccidiosis which comprises a compound of the formula $$\begin{array}{c} \text{N}\!\!=\!\!=\!\!\text{C}\!-\!\text{CONHCR}' \\ \| \quad\quad \| \quad\quad\quad\quad \| \\ \text{HC} \quad\quad \text{C}\!-\!\text{CONHCR}' \\ \diagdown\;\;\diagup \quad\quad\quad\quad \| \\ \text{N} \quad\quad\quad\quad\quad\; \text{O} \\ | \\ \text{R} \end{array}$$

in intimate dispersion in an animal feedstuff, where R is selected from the class consisting of hydrogen, methyl and ethyl and R' is a lower alkyl radical.

22. A composition useful against coccidiosis which comprises a solid animal feed ingredient having in intimate dispersion therein from about 0.1% to about 40% by weight of 4,5-bis-(N-acetylcarbamyl)-imidazole.

23. A composition useful against coccidiosis which comprises a solid animal feed ingredient having in intimate dispersion therein from about 2% to about 25% by weight of 4,5-bis-(N-acetylcarbamyl)-imidazole.

24. A composition useful against coccidiosis which comprises an animal feedstuff having in intimate dispersion therein from about 0.002% to about 0.025% by weight of 4,5-bis-(N-acetylcarbamyl)-imidazole.

25. A composition useful against coccidiosis which comprises an animal feedstuff having in intimate dispersion therein from about 0.002% to about 0.025% by weight of 1-ethyl-4,5-bis-(N-proprionylcarbamyl)-imidazole.

26. A composition useful against coccidiosis which comprises an animal feedstuff having an intimate dispersion therein from about 0.01% to about 0.05% by weight of 1-ethyl-4,5-bis-(N-acetylcarbamyl)-imidazole.

27. A composition useful against coccidiosis which comprises a compound of the formula

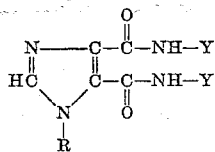

in intimate dispersion in a solid animal feed ingredient, where Y is selected from the class consisting of hydrogen and

R is selected from the class consisting of hydrogen, methyl and ethyl, and R' is a lower alkyl radical, at least one Y being hydrogen.

28. A composition useful against coccidiosis that comprises 4-acetylcarbamyl - 5 - imidazolecarboxamide in intimate dispersion in an animal feedstuff.

29. A composition useful against coccidiosis which comprises a solid animal feed ingredient having in intimate dispersion therein from about 0.1% to about 40% by weight of 1-ethyl-4,5-bis-(N-acetylcarbamyl)-imidazole.

References Cited in the file of this patent
UNITED STATES PATENTS 2,534,331    Woodward _____ Dec. 19, 1950

OTHER REFERENCES

Chem. Abst. Decennial Index, vols. 31–40, 1937–1946, p. 6564.